(12) United States Patent
Duffner et al.

(10) Patent No.: US 11,150,799 B2
(45) Date of Patent: Oct. 19, 2021

(54) INTERACTIVELY CONTROLLING A MACHINE WITH FEEDBACK FROM A CONTROL PARAMETER

(71) Applicant: ARBURG GMBH + CO KG, Loßburg (DE)

(72) Inventors: Eberhard Duffner, Starzach (DE); Werner Faulhaber, Loßburg Wittendorf (DE)

(73) Assignee: ARBURG GMBH + CO KG, Loßburg (DE)

( * ) Notice: Subject to any disclaimer, the term of this patent is extended or adjusted under 35 U.S.C. 154(b) by 231 days.

(21) Appl. No.: 16/343,074

(22) PCT Filed: Oct. 18, 2017

(86) PCT No.: PCT/EP2017/076589
§ 371 (c)(1),
(2) Date: Apr. 18, 2019

(87) PCT Pub. No.: WO2018/073294
PCT Pub. Date: Apr. 26, 2018

(65) Prior Publication Data
US 2020/0050354 A1    Feb. 13, 2020

(30) Foreign Application Priority Data

Oct. 18, 2016 (DE) .................. 10 2016 119 853.6

(51) Int. Cl.
*G06F 3/00* (2006.01)
*G06F 3/0488* (2013.01)
(Continued)

(52) U.S. Cl.
CPC .......... *G06F 3/04883* (2013.01); *G06F 3/016* (2013.01); *G06F 3/0416* (2013.01);
(Continued)

(58) Field of Classification Search
None
See application file for complete search history.

(56) References Cited

U.S. PATENT DOCUMENTS

| 4,704,676 A | 11/1987 | Flanagan |
| 4,706,676 A | 11/1987 | Peck |
| 6,921,336 B1 * | 7/2005 | Best ................ A63F 13/10 463/32 |
| 2004/0021698 A1 | 2/2004 | Baldwin |

(Continued)

FOREIGN PATENT DOCUMENTS

| DE | 91103487 U1 | 1/1992 |
| DE | 102005052725 B3 | 11/2005 |

(Continued)

OTHER PUBLICATIONS

International Search Report for corresponding application PCT/EP2017/074589 filed Oct. 18, 2017; dated Mar. 20, 2018.

*Primary Examiner* — Paul B Yanchus, III
(74) *Attorney, Agent, or Firm* — Cantor Colburn LLP (57) ABSTRACT

The invention relates to a human machine interface (1) for simultaneously and interactively controlling a control function of a machine (3). The human machine interface (1) comprises a control input unit (5) by means of which a control parameter of a control function of the machine (3) can be simultaneously manually operated in accordance with a parameter input (27), a parameter input unit (7) which can be controlled independently from the control input device (5) and which enables a control parameter of the control function to be manually controlled, and a parameter display unit (9) arranged together with the parameter input unit (7) and which enables feedback of the control parameter to be manually controlled. As a result, the intuitive ease of operation, the security and ergonomics are improved such that a control parameter of the control function dependent on the control function can be manually controlled simultaneously by means of the control input unit (5) and that the parameter display unit (9) enables information relating to the desired (Continued)

value or an actual value of the manually controlled parameter and which is present on the machine (3) can be fed back.

16 Claims, 3 Drawing Sheets

(51) Int. Cl.
  *G06F 3/01*  (2006.01)
  *G06F 3/041*  (2006.01)
  *G06F 3/0482*  (2013.01)
  *G06F 3/0484*  (2013.01)
  *B29C 45/76*  (2006.01)

(52) U.S. Cl.
  CPC ........ *G06F 3/0482* (2013.01); *G06F 3/04847* (2013.01); *B29C 2045/7606* (2013.01)

(56) References Cited

U.S. PATENT DOCUMENTS

| | | | |
|---|---|---|---|
| 2004/0201765 A1* | 10/2004 | Gammenthaler | H04N 5/76 348/333.01 |
| 2006/0016800 A1 | 1/2006 | Paradiso | |
| 2017/0292712 A1* | 10/2017 | Alexander | G06F 3/04883 |

FOREIGN PATENT DOCUMENTS

| | | |
|---|---|---|
| DE | 102004051106 A1 | 4/2006 |
| DE | 60113685 T2 | 7/2006 |
| DE | 102010051639 A1 | 5/2012 |
| DE | 102012011156 A1 | 12/2012 |
| EP | 1273851 A2 | 1/2003 |
| EP | 1656245 B1 | 12/2007 |
| WO | 2007025396 A1 | 6/2006 |
| WO | 2012155167 A2 | 11/2012 |

\* cited by examiner

INTERACTIVELY CONTROLLING A MACHINE WITH FEEDBACK FROM A CONTROL PARAMETER

CROSS-REFERENCE TO RELATED APPLICATIONS

The present application refers to and claims the priority of the German patent application 10 2016 119 853.6, which was filed on 18 Oct. 2016, the disclosure of which is hereby expressly incorporated by reference into the subject matter of the present application in its entirety.

FIELD OF THE INVENTION

The invention relates to a human-machine interface as well as to a method of interactively controlling a regulating function of a machine by a manual regulating input.

PRIOR ART

Human-machine interfaces for the interactive control of machines are known for example for training and/or setting up an injection moulding machine wherein a series of manual regulating processes are necessary. To this end, the corresponding machines can be connected to and/or incorporate a human-machine interface. For such tasks, it is known to use hard-wired logic elements and/or key fields, keyboards, manipulators and/or touch-sensitive screens. The human-machine interface can be connected to the machine by an appropriate data processing unit or a machine control system and thereby enable complex regulating processes to be effected via this connection.

A control device for a plastics-processing machine having multi-touch functionality in the form of a human-machine interface is known from DE 10 2010 051 639 A1 which forms the preamble of the independent Claims. Machine operations and production parameters are able to be input by an operator and are displayable and changeable on this control unit.

A method and a device are known from EP 1 656 245 B1 for interactively controlling a synthetic material injection moulding machine working in particular cyclically. The interactive controlling process is effected by means of an input unit which is connected to the injection moulding machine by a data processing unit. Input fields can be assigned virtually.

DE 10 2005 052 725 B3 depicts an operating element for an injection moulding machine with a screen for the representation of program data which is configured partially as a touch screen. Virtual function keys can be provided outside of the screen as well as on the screen. For this purpose, the screen protrudes the touch screen.

DE 601 13 685 T2 discloses an interface for controlling a machine having configurable keys, i.e. soft keys, in regions parallel to the screen.

US 2004/0021698A1 proposes a graphic interface for a multi-function device having a touch-sensitive display on which a hierarchy of graphical objects for the multi-function operation process is displayable to a user.

OBJECT OF THE INVENTION

Proceeding from this prior art, the object of the present invention is to improve the process of interactively controlling a complex machine in regard to the ergonomics, security and intuitive operability thereof.

This object is achieved by a human-machine interface incorporating the features of Claim 1 as well as by a method incorporating the features of Claim 10 and an injection moulding machine incorporating the features of Claim 16. Advantageous further developments form the subject matter of the dependent Claims. The individual features specified in the Claims are combinable with one another in a technologically meaningful way and can be supplemented by explanatory matter from the description and by details from the Figures wherein further variants of embodiments of the invention are presented.

The human-machine interface comprises a regulating input unit and a parameter input unit that is operable independently thereof. A regulating function of a machine can be controlled manually by means of the regulating input unit in dependence on a regulating input. A regulating function can be understood in particular as meaning the adjustment of a parameter or preferably of a movement of a moveable component of the machine that is actually taking place. The regulating function can be controlled manually, simultaneously and interactively by an appropriate manual regulating input on the regulating input unit. This can be effected, in particular, bi-directionally, what for example can correspond to a forward and backward movement of the moveable component. In principle, such a movement can be effected at different speeds, whereby in this case, the speed serving as a parameter is influenceable by means of the parameter input unit. Thereby, comparatively high regulating speeds can be desirable in order to enable the corresponding regulating function to be concluded and/or achieved as fast as possible. In contrast thereto however, lower regulating speeds can also be desirable particularly in the region of the end position in the event of an occurrence of high pressures and/or high forces during the regulating function process.

Insofar as parameters are mentioned in the context of this application, then this refers not only to the speed of a movement but also to the parameters which are entered for operating an injection moulding machine. These are pressure, temperature, time points such as e.g. switch-over times between the injecting and dwell pressure phase, time points for operating the ejector, partial cycle times e.g. in the case of multi-component injection processes, path information for the mould closing unit, mould height, dosage and amount to be injected, flow rate, the quantity of addable components and much more besides such as are commonly within the competence of a specialist in injection moulding machines. The preferred field of employment of the invention then lies in the field in which mutually dependent parameters are to be entered.

For the purposes of controlling the regulating function, an operator of the machine can simultaneously manually control the regulating parameter thereof by means of the parameter input unit. Consequently, two functionally mutually dependent parameters can thereby be controlled independently. Conceivable here for example are processes of controlling/entering the pressure and temperature, a pressure and flow rate as well as preferred variables such as the path of a mould together with the path of an ejector or else too, the acceleration and/or speed of one or more elements of the injection moulding machine.

There is thus a best possible compromise especially during the process of training the machine for a new process, from comparatively rapid execution of the regulating function and avoidance of possibly arising unwanted effects in the event of regulating speeds that are too high or movements giving rise to collisions if e.g. an ejector is driven into a self-opening mould. Due to the parameter display unit which is arranged together with the parameter input unit on the human-machine interface, it is possible for the operator of the machine to always be fully conscious of the regulating parameters. In addition, the manually controlled regulating parameter is capable of being fed back as a nominal value or as a currently occurring value actually arising in the machine by means of the parameter display unit. The regulating parameter is functionally dependent on the regulating function. In the example of the input of a speed in connection with a correcting variable, this means that the speed will be indicated by the parameter display unit which is arranged together with the parameter input unit for the input of the speed on the human-machine interface so that the operator will always be aware of these parameters. Thus, the security, ergonomics and intuitive operability of the machine can be improved since the operator of the machine receives a direct feedback, in particular precisely there where the regulating speed can also be manually controlled, i.e. on the speed input unit, in order to remain with the example of speed.

Arranged together can be understood as meaning a neighbouring, one-above-the-other, next-to-each-other and/or superimposed arrangement and/or a spatial association. The feedback of the regulating parameter such as a speed can be effected in different ways, in particular, by highlighting a nominal value i.e. the manually entered parameter or a current value of the parameter actually occurring in the machine, in particular, in the form of a regulating parameter magnitude that is dependent thereon. The direct feedback of the regulating parameter such as a regulating speed can be effected optically, in haptic and/or tactile manner, in particular, in the form of a scale indication.

In a preferred exemplary embodiment of the human-machine interface, provision is made for the parameter display unit to comprise a bar graph indicator that is aligned along a longitudinal touch-sensitive surface of the parameter input unit. A bar graph indicator can be understood in the broadest sense as a laminar dial read-out, in particular, a pictorial depiction of a bar or a bar chart. It is however also conceivable for the bar graph indicator to be variably curved and in particular have a rounded shape.

The bar graph indicator can be realized passively or actively with illuminated segments particularly in the form of pixels, as a ribbon-type indicator with a multiplicity of illuminated segments and/or in some other way.

Preferably, the bar graph indicator comprises a plurality of separately controllable illuminated segments such as light emitting diodes which are disposed linearly one behind the other. The touch-sensitive longitudinal surface is arranged along the bar graph indicator. During a setting process on the touch-sensitive surface, it is thereby possible for the bar graph indicator to follow an operating input that is required therefor. In particular, a process of stroking the touch-sensitive surface by means of a part of the body can be followed directly by a corresponding lengthening or shortening of a bar of the bar graph indicator and thus the entered or selected regulating speed can be simultaneously fed back visually.

In a further preferred exemplary embodiment, provision is made for a modulatable illuminated readout by means of which a state of the machine is displayable to be arranged at least laterally of or on each side of the bar graph indicator. Modulatable can be understood as meaning that the indicator is changeable in regard to its colour, flashing pattern, flashing frequency, brightness and/or any other arbitrary property for indicating the state of the machine. Preferably, at least the colours green for in order and red for critical can be used and, if so required, an arbitrary number of intermediate tones for the purposes of symbolizing a state between in order and critical. It is particularly preferred that not only the illuminated readout be modulated but also additionally the parameter display unit, whereby if necessary, the majority of the illuminated segments of the bar graph indicator can be modulated in exactly the same way as the illuminated readout. This results in the advantage that even in the case of a parameter value of zero in the event of which for example none of the illuminated segments of the bar graph indicator is illuminated, the state of the machine can still be indicated. Due to the fact that the illuminated readout is arranged laterally of or on each side of the bar graph indicator, feedback is likewise provided at the point where the parameter such as the regulating speed is arranged to be input. Consequently, intuitive read-out of the state and improvement in operational security are possible.

In a further exemplary embodiment, the bar graph indicator and/or the illuminated readout are conical, whereby the illuminated readout preferably extends in the shape of a Y over the human-machine interface. Extension of the illuminated readout in the shape of a Y can be understood as meaning that, commencing from a corner of the human-machine interface, it extends on each side of the bar graph indicator and then runs off at an angle parallel to two of the sides of the human-machine interface commencing from said corner. Consequently, the illuminated readout is always visible from any viewpoint of a display area of the human-machine interface. Moreover, the illuminated readout cannot therefore be completely covered by any possible activities of parts of the body of an operator such as a hand or an arm for example, i.e. even then it is always visible. Detection of the state can thus be improved and security of operation can be increased.

A further alternative of the human-machine interface envisages that it comprises an independently operable selection input unit. The regulating function can be selected by a manual control action by means of the selection input unit. Due to the independent operability of the selection input unit, the operator of the machine is always aware of which regulating functions he has selected from a plurality of regulating functions. It is particularly preferred and conceivable that the selection of the regulating function be likewise fed back. In particular, directly at the selection input unit and/or additionally too at the regulating input unit.

Preferably, the parameter display unit and/or the parameter input unit are arranged between an input unit especially for permanently assigned keys and the regulating input unit. The regulating parameter can be entered in a particularly simple manner and its feedback be observed due to this central arrangement.

In a further exemplary embodiment of the human-machine interface, the input unit and/or the parameter input unit can comprise glass cylinders in the form of haptically perceptible operating elements which are let into and are flush with the surface. Glass can be understood as meaning any kind of transparent material, i.e. acrylic glass too. Due to the surface-flush arrangement, a surface of the human-machine interface can easily be cleaned whereby tactile feedback is nevertheless still possible due in particular, to the palpability of the glass cylinders. In particular, the operating elements may exhibit a customary or conventional force-path characteristic that is typical of a key or push-button. Preferably, the let-in glass cylinders can be part of a multi-touch type of input equipment similar to a protective glass on a touch-sensitive screen, i.e. be in the form of sensor keys which nevertheless enable the desirable haptic or tactile feedback process to occur.

Moreover, it is conceivable for the physically present operating elements to be optically assigned, in particular, by static and especially imprinted symbols so that they are identifiable with a static function. This likewise enables a secure operation of the human-machine interface since system-critical operations and in particular selection processes at the input unit are always to be found again in the same place. In consequence, inadvertent faulty operations i.e. inadvertent placement of a component part of the machine can be avoided.

Furthermore however, operating elements of the regulating input unit can be assigned dynamically, in particular in dependence on the need, characterized according to a particular selection at the selection input unit or else if necessary, the input unit too. For example, they can be illustrated in the form of an appropriate symbol on an additional display. An optimum compromise between a static and dynamic use of the operating elements can thereby be found. An operation is effected consciously and by means of statically located and statically assigned operating elements. The actual process of controlling the regulating function taking place thereafter can in fact be effected by means in particular of likewise statically arranged operating elements, although they could be assigned dynamically to the respective regulating function. Furthermore, it is additionally possible for the parameter setting unit to also be arranged statically on the human-machine interface i.e. to always be associated with the same location. Thus the further critical magnitude too, namely the regulating parameter such as a regulating speed can always be manually controlled in a secure and consciously aware manner.

In accordance with a further alternative, the human-machine interface can be equipped with a touch-sensitive screen which is operable independently of the input units described hereinabove. Preferably, the previously described input units are arranged at the edge of the screen. It is particularly preferred that a touch-sensitive surface of the screen should not only cover its display unit but also the rest of the input units. In one design of the touch-sensitive screen in the form of a so-called multi-touch display, it is possible to simultaneously process a plurality of inputs in the form of contacts at different points of the screen. Further functions of the human-machine interface can be realised by means of the touch-sensitive screen, in particular, a graphical representation of a process, such as e.g. a training process by the manual control system, the display of a keyboard for the input of data and/or the like. Due to the independently operable input units in combination with the touch-sensitive screen, a secure intuitive operation can be effected without having to thereby forego the flexibility offered by the touch-sensitive screen.

Furthermore, the regulating input unit, the parameter input unit and/or the input unit can be directly connected to a machine control system of the machine by means of a serial real time interface in particular. Manual control of the machine can thereby be carried out without time delay or at least without any time delay worth mentioning. Possible programming processes and/or computer-intensive training processes can be carried out if necessary by means of the touch-sensitive screen and/or by means of a suitable computer unit e.g. in the machine control system and/or at the human-machine interface. Independently thereof, manual control can be effected directly and without time delay by means of the real time interface. This makes it possible for a parameterisation process in real time.

The method of interactively controlling a regulating parameter of a machine is carried out in particular by means of a human-machine interface that is described above. To that extent, the advantages described hereinabove then result. Firstly, the regulating input unit is provided. This comprises in particular the haptically perceptible operating elements, in particular, with permanently associated pictograms and/or symbols, for example, in the form of arrows and/or plus, minus signs. In the case of a bi-directional control system, the operating elements can be provided in pairs. Detection of a manual entry for manually controlling the regulating function of the machine is effected by means of the regulating input unit. Also provided moreover, is the parameter input unit by means of which simultaneous detection of a further manual parameter input is effected for manually controlling a parameter that is functionally dependent on the regulating function. A parameter such as e.g. a speed of the regulating function can thereby be manually controlled. Finally, a parameter indicator is provided with the aid of the human-machine interface so that by means thereof control of the regulating function and the regulating parameter is effected directly i.e. simultaneously and feedback of a nominal value or of a current value actually occurring in the machine of the regulating parameters of the regulating function is effected thereby by means of the provided parameter display unit. Thus in particular, the set regulating parameter or a regulating parameter of the regulating function that is actually occurring in the machine can be fed back. The simultaneous or direct feedback of an e.g. regulating speed or some other parameter makes intuitive operation possible and increases operational security by for example preventing a regulating parameter inadvertently selected too high.

Preferably in the method, the regulating input unit and/or the input unit are connected to a machine control system of the machine by means of a real time interface in such a way that a direct feedback between the control system and the input unit in regard to the nominal value and the actual values is possible. In consequence, the intuitive operation of the control process and thus of the machine can be facilitated not only by the parameterisation process but also by the process of operating the machine.

Preferably in the method, there follows the provision of a selection input unit by means of which detection of a manual selection input for the purposes of selecting the regulating function is effected. It is only after the occurrence of a manual selection input, that the process of enabling the regulating input unit is effected, in particular, of one or of a pair of operating elements of the regulating input unit for the purposes of detecting the manual regulating input. Thus, the regulating input is detected in dependence on the detected selection input, namely, when and only when the regulating function has also been selected beforehand from a plurality of regulating functions. Preferably, the input unit or individual operating elements of the input unit can be blocked so that blocked unavailable regulating functions are also not selected and in consequence cannot be set. Likewise, the regulating functions can be provided with an end switch-off function so that over running an end stop despite an appropriate input at the regulating input unit is preventable in a secure manner. Unwanted damage to the machine can thereby be prevented. An appropriate warning for example can be displayed on the human-machine interface at the same time.

Preferably, feed back of the enabling process and/or of the selected regulating function is effected at the regulating input unit and/or at the input unit. Intuitive operation of the human-machine interface is thereby possible. The feed back of the enabling process can be effected for example by back-lighting the correspondingly operated operating element of the input unit to a greater level of luminous intensity. As an alternative or in addition thereto, this can also be effected at the regulating input unit, in particular, at the operating element of the regulating input unit that is dynamically assigned to or is then available for this purpose. Moreover, it is possible for the regulating function to be symbolized at or on the operating element of the regulating input unit e.g. by means of an appropriate function pictogram or symbol.

Preferably, a touch-sensitive screen is provided at the human-machine interface. It is possible that the process of visualizing the selected regulating function is effected by means of the screen, in particular, in a spatial relationship or at close range to the physical operating element of the regulating input unit. It is thereby possible to dynamically assign the latter i.e. in dependence on the selection input. Due to the visualization of the selected regulating function, the operator of the human-machine interface or of the machine can check at any time as to which regulating function he is currently implementing. Accordingly, detection of the manual regulating input is effected by means of the operating element on which the regulating function is visualized. The visualization process can be effected for example directly beside the corresponding operating element on the screen.

It is particularly preferred that dynamic assignment of the physical operating element of the regulating input unit is effected in dependence on the manual selection input and detection of the manual regulating input by means of the physical operating element of the regulating input unit. It is thereby possible to make a comparatively large number of regulating functions manually controllable with good intuitive operability and a high degree of security using a comparatively small number of physical operating elements of the regulating input unit. Symbolizing the selected regulating functions is preferably effected on or besides the dynamically assigned operating element of the regulating input unit, in particular, only in the case where a corresponding selection input has also been effected at the selection input unit beforehand. In particular, the dynamic assignment of the operating element of the regulating input unit can be withdrawn i.e. blocked again, by repeated operation of the selection input unit.

Moreover, the object is achieved by a machine and in particular an injection moulding machine having a previously described human-machine interface and/or equipped, configured and/or programmed to carry out a method as described hereinabove. The advantages described above result.

Further advantages will be apparent from the appendant Claims and the following description of a preferred exemplary embodiment.

SHORT DESCRIPTION OF THE FIGURES

In the following, the invention is described in more detail with reference to an exemplary embodiment. There is shown:

FIGS. 4a, 4b respective plan views from above of the human-machine interface illustrated in FIGS. 1 to 3, wherein FIG. 4b shows a detail of the human-machine interface symbolized in FIG. 4a by means of a dash-dotted circle.

DETAILED DESCRIPTION OF PREFERRED EXEMPLARY EMBODIMENTS

The invention will now be described exemplarily in more detail with reference to the accompanying drawings. Nevertheless, the exemplary embodiments merely relate to examples which are not intended to restrict the inventive concept to a certain arrangement. Before the invention is described in detail, it should be pointed out that it is not restricted to the particular components of the device and the particular method steps since these components and methods can vary. The expressions used herein are only intended to describe special embodiments and are not used restrictively. If, in addition, the singular or indefinite articles are used in the description or in the Claims, then this also refers to a plurality of these elements insofar as the general context does not make it unambiguously clear that something else is intended.

The Figures show a human-machine interface 1 in the form of different views. In the following, reference is made to the Figures equally unless something to the contrary is mentioned.

The human-machine interface 1 serves for the interactive control of a machine that is not illustrated in detail but is merely symbolized by means of the reference symbol 3. In the case of the machine 3, this is, in particular, an injection moulding machine for the processing of synthetic materials and other plasticizable materials such as e.g. powdery or ceramic masses. In particular, the injection moulding machine comprises at least one plasticizing unit and a mould closure unit and preferably a plurality of moveable and adjustable components the location of which can be controlled manually or adjusted by appropriate operator input at the human-machine interface 1. To this end, the human-machine interface 1 comprises a regulating input unit 5 that is arranged on a right-hand edge 31 as well as an input unit 17 that is arranged on a lower edge 33. A selection input unit 42 is formed by assignable keys on the screen itself. The regulating input unit 5 and the input unit 17 are arranged above a corner 35 along the edges 31 and 33 of the human-machine interface 1. Hereby, they are arranged adjacent to each other at the corner 35 in the manner of a mitre joint, whereby a free space is left between them.

A parameter input unit 7 is arranged in the free space remaining between the regulating input unit 5 and the input unit 17. The parameter input unit 7 comprises a surface 11 which fills up the free space remaining between the input unit 17 and the regulating input unit 5. The surface 11 is in the form of a touch-sensitive surface, i.e. it reacts to contacts made by an operator of the human-machine interface 1. The surface 11 is therefore part of the parameter input unit 7, whereby, in like manner to the process of adjusting a slider, stroking the strip-like surface 11 makes for an intuitive adjustment process for regulating the speed of a regulating function of the machine 3.

Herein, a parameter is to be understood as meaning the parameters which can be entered for operating an injection moulding machine. These are pressure, the speed of a movement, temperature, time points such as e.g. switch-over time points between the injection and dwell pressure phase, the time points for operating the ejector, partial cycle times e.g. in the case of multi-component injection processes, path-information for the mould closing unit, mould height, dosage and injection amount, flow rate, the quantity of addable components and much more besides, i.e. the usual factors relevant to a specialist in injection moulding machines. The preferred field of employment of the invention thus lies in those areas in which mutually dependent parameters are to be entered.

The human-machine interface 1 likewise comprises in the free space a longitudinally extending or strip-like parameter display unit 9. The parameter input unit 7 and the parameter display unit 9 are arranged together, predominantly one above the other between the regulating input unit 5 and the input unit 17. The e.g. speed of movement of the components of an injection moulding machine can be entered and indicated thereby. The parameter display unit 9 comprises a bar graph indicator 13, preferably incorporating a plurality of light segments which are depicted exemplarily in FIG. 2. A higher or lower regulating speed of the regulating function can be symbolized in dependence on the number of segments of the bar graph indicator 13 that are illuminated. The bar graph indicator 13 preferably follows a process of stroking the surface 11 of the parameter input unit 7. As an alternative however, it is also conceivable that a regulating parameter actually occurring in the machine 3 be reported back by means of the bar graph indicator 13. The feedback of the regulating parameters is advantageously effected simultaneously with the touching of the surface 11 and/or the actually occurring regulating parameter, i.e. the actual process of adjusting a regulating speed serving as a regulating parameter for example.

Figure 1A:
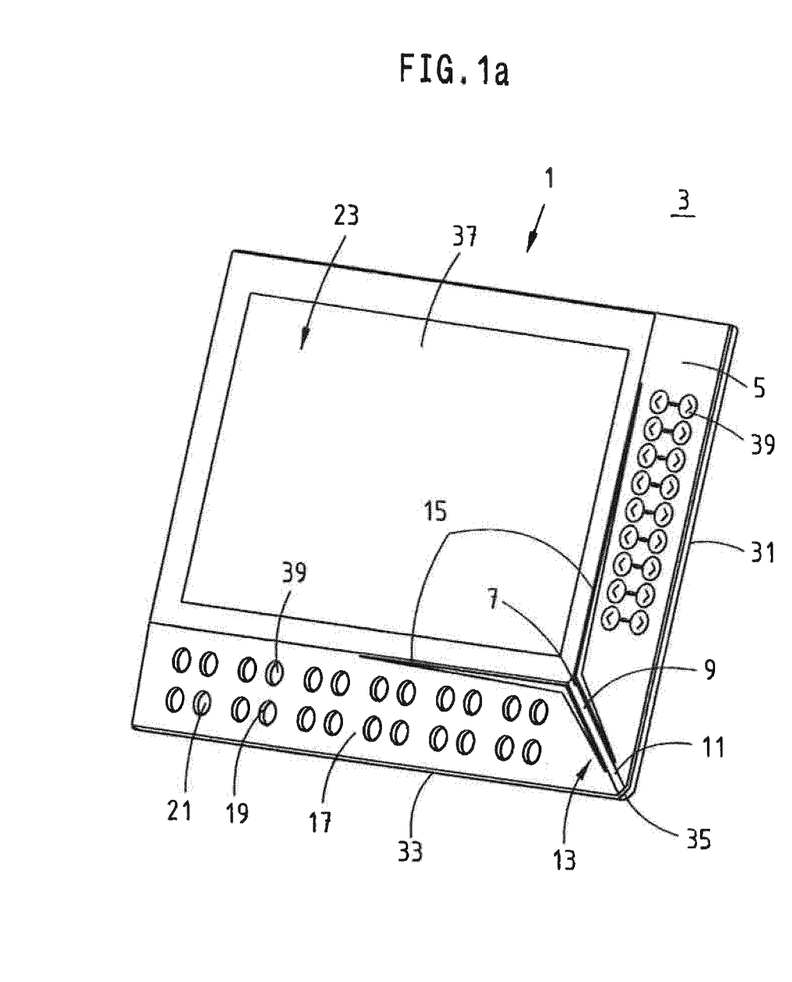
FIGS. 1a, 1b respective three-dimensional views from the inclined front and the rear of a human-machine interface for interactively controlling a machine.
Figure 2:
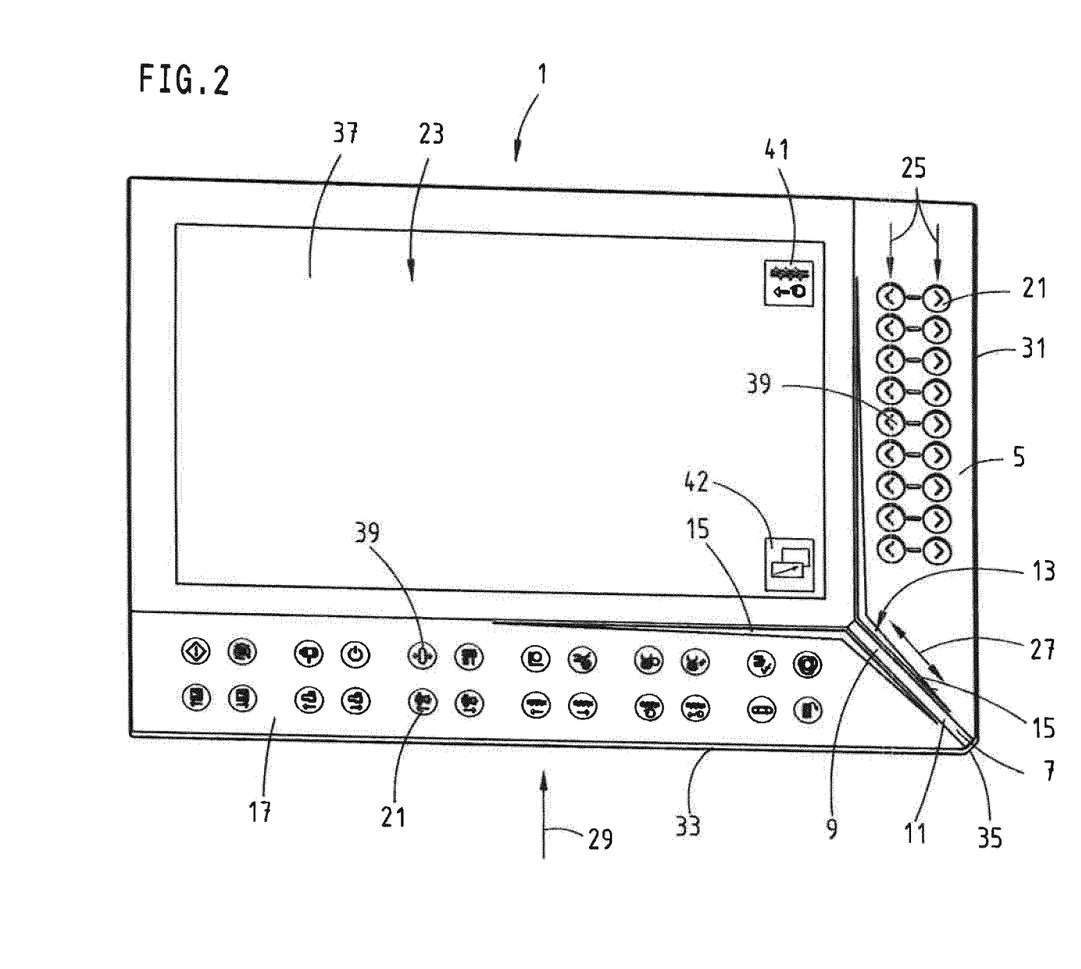
FIG. 2 a plan view of a control surface of the human-machine interface illustrated in FIGS. 1a and 1b.

As can be perceived in FIGS. 1a and 2, an illuminated readout 15 is arranged on each side of the parameter display unit 9, in particular on each side of the bar graph indicator 13. Starting from the corner 35, the illuminated readout 15 extends along the longitudinal extent of the free space or of the parameter display unit 9 arranged therein and spreads out in the shape of a Y at an internal end of the parameter display unit 9. It extends, in particular, in the shape of a Y in parallel along the input unit 17 and the regulating input unit 5.

Feedback of a state of the machine 3 can be effected simultaneously with the interactive process of controlling the machine 3 by means of the illuminated readout 15. This can be effected by modulating the illuminated readout, in particular by altering a colour of the illuminated readout 15. An operator of the human-machine interface 1 can thus always be kept informed about the state of the machine 3, in particular in regard to the currently occurring manually controlled regulating function.

Moreover, the human-machine interface 1 comprises a touch-sensitive screen 23 that is visible in FIGS. 1a and 2. The regulating input unit 5 and the input unit 17 are arranged on two adjoining sides of the screen 23 neighbouring the screen 23 or along the sides. The screen 23 can be implemented as a so-called touch screen, in particular, one having multiple-touch capability, i.e. where a plurality of points are activated at the same time. Preferably, a touch-sensitive surface 37 of the screen 23 extends over the regulating input unit 5 and the input unit 17. Thus for example, the surface 11 can be provided for the operation of the parameter input unit 7. In accordance with an alternative however, the surface 11 could also comprise a separate device for detecting contacts and the regulating input unit 5 and/or the input unit 17 can be conventional or separate keys.

Both the input unit 17 and the regulating input unit 5 comprise a plurality of operating elements 21 that are provided physically fixed. Preferably, these comprise transparent cylinders, preferably glass cylinders 19. The glass cylinders can be formed from any transparent material such as glass, acrylic glass, another transparent synthetic material and/or the like. Preferably, the surface 37 and the glass cylinders 19 comprise identical materials.

The operating elements 21 of the input unit 17 have different pictograms 39 for symbolizing a regulating function of the machine 3 that is selectable thereby and are preferably permanently assigned to these functions. For example hereby, there is a pictogram for symbolizing a screw movement of a plasticising unit of the machine 3. Pressing or actuating the appropriate operating element 21 leads to two adjacently located operating elements 21 of the regulating input unit 5 being enabled for the corresponding regulating function, i.e. adjustment of the screw. Certain regulating inputs or operating elements 21 of the regulating input unit 5 can be selected for the further operation by at least one selection input unit 42 that is representable on the screen 23—only one symbol for this is illustrated in the exemplary embodiment but there could be more.

In a preferred alternative, a symbol 41 such as e.g. a split symbol which signifies a functional assignment of the operating elements 21 such as for example the directions of the screw movement appears on the touch-sensitive screen beside the operating elements 21 of the regulating input unit 5. The description of the screw movement is exemplary and can be used in analogous manner for every possible regulating function of the machine 3, an injection moulding machine in the exemplary embodiment.

It is apparent that the input unit 17 and/or the selection input unit 42 too comprise significantly more operating elements 21 than regulating functions that can be manually controlled at the same time by means of the regulating input unit 5. Nevertheless, in order to enable all the regulating functions to be controlled, the operating elements 21 of the regulating input unit 5 are dynamically assigned as described above, i.e. are characterized by one of the symbols 41 as necessary, or are re-enabled for assignment to a further regulating function after being re-actuated and/or after the passage of a certain period of time and/or in accordance with some other condition.

Thus, for the purposes of controlling a regulating function of the machine 3, a selection input 29 is firstly effected at one of the operating elements 21 of the selection input unit 42. In like manner however, an input can be effected by means of one of the operating elements 21 of the input unit 17 that is permanently assigned to a function. As a reaction thereto, two operating elements 21 of the regulating input unit 5 are enabled, i.e. they are dynamically assigned and are characterised by the symbol 41 for the selected regulating function on the touch-sensitive screen 23. After the selection of the regulating function has been effected, it can be manually controlled by a regulating input 25 at the two operating elements 21 of the regulating input unit 5, in particular bi-directionally, as is preferably symbolized by the arrow symbols on the operating elements 21.

During the process of operating the regulating input unit 5, e.g. the regulating speed of the correspondingly selected regulating function, i.e. the screw movement for example, can be simultaneously adjusted by a process of stroking the surface 11 on the parameter input unit 7. The description of the speed of the screw movement as a parameter is exemplary and can be utilised in analogous manner for every possible regulating function of the parameters of the machine 3. Moreover, the display of the regulating speed that has been entered or selected is likewise effected simultaneously by means of the parameter display unit 9. The process of entering the regulating speed is effected by means of a parameter input 27, in particular, a bi-directional process of stroking the surface 11. The inputs 25 to 29 are symbolized by means of arrows in FIG. 2.

Figure 1B:
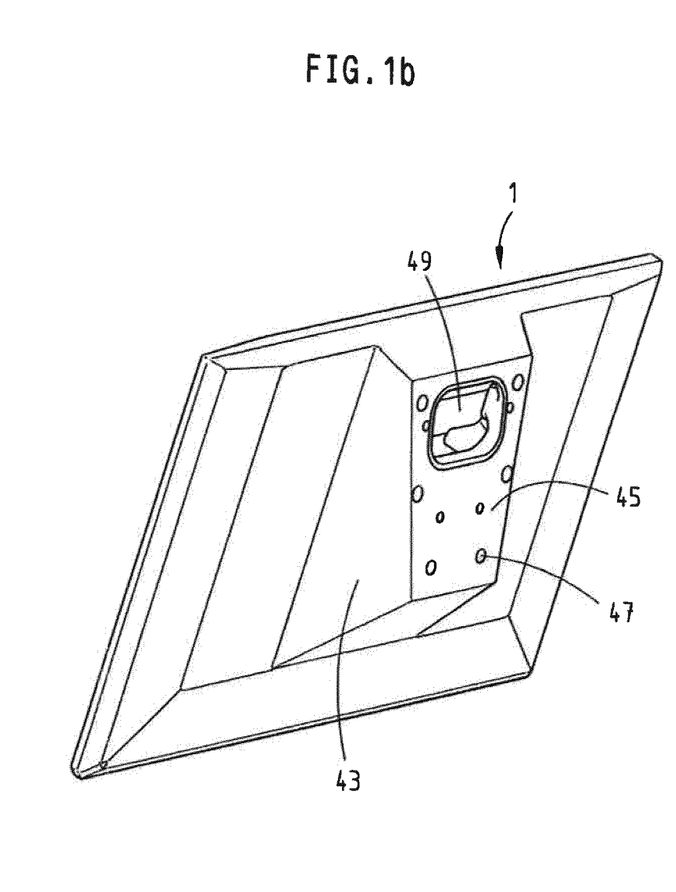
Figure 3:
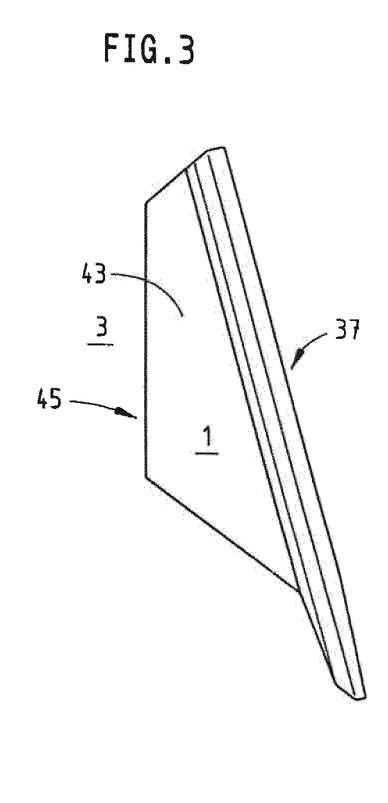
FIG. 3 a side view of the human-machine interface illustrated in FIGS. 1 and 2.
Figures 4A, 4B:
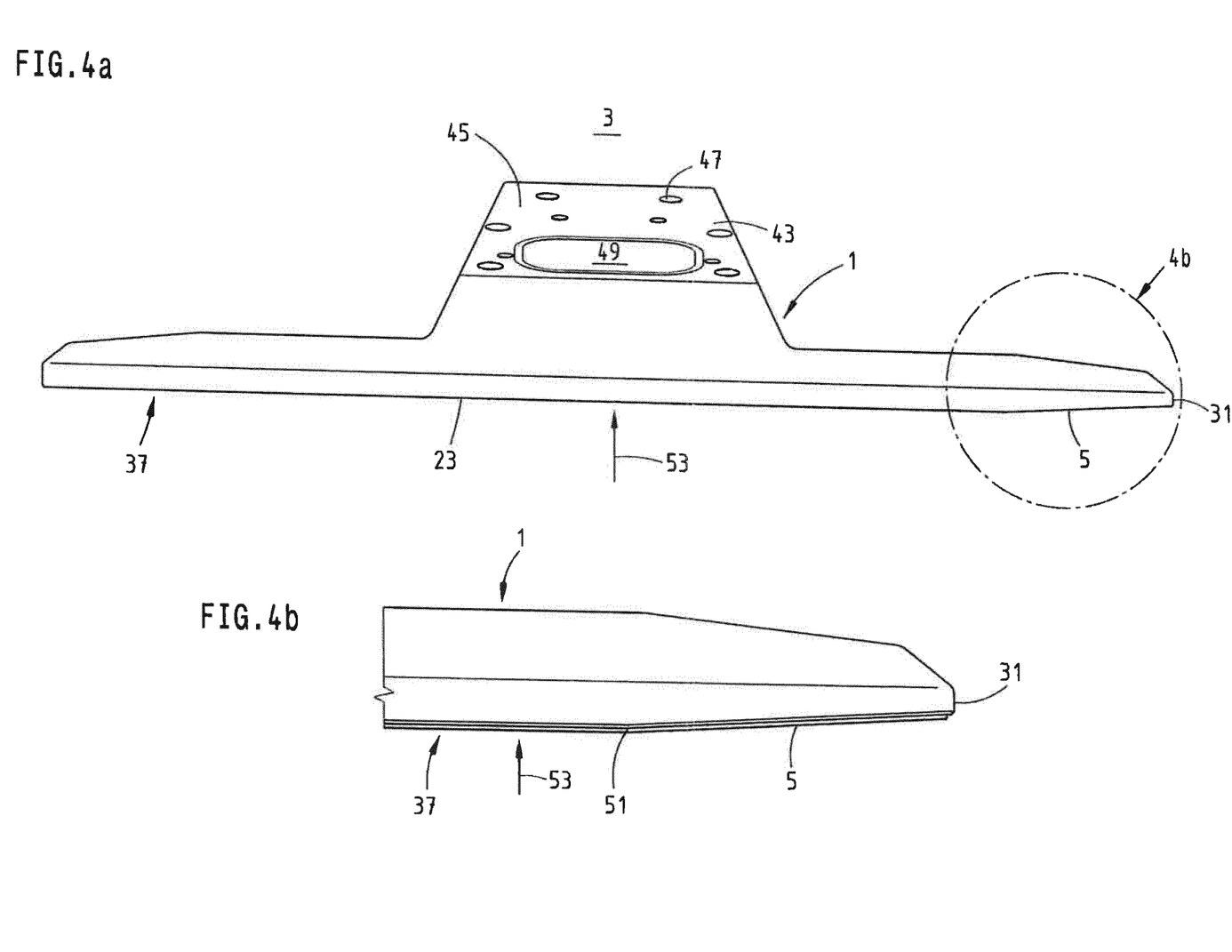

As can be perceived in FIGS. 1b, 3 and 4a, the human-machine interface 1 comprises a mounting console 43. The mounting console 43 comprises a mounting surface 45 which is arranged at an acute angle to the surface 37 of the screen 23. It is thereby possible to attach the human-machine interface 1 to a vertical wall of the machine 3 or to a stand on the machine in such a way that the screen 23 is inclined relative to the vertical. The ergonomics and in particular the processes of reading from and/or making an entry on the human-machine interface 1 can thus be improved. In particular, observation and reading off the human-machine interface 1 at an angle from above can be facilitated. As can be perceived in FIGS. 1b and 4a, the mounting surface 45 comprises borings 47 for mounting purposes and a through hole 49 for making contact with the machine 3.

Moreover, for the purposes of improving the ergonomics, the regulating input unit 5 and/or the input unit 17 are inclined at least slightly with respect to the surface 37 of the screen 23, as can be perceived particularly well from the detail depicted in FIG. 4b. The surface 37 and the input units 17 and/or 5 are arranged at an obtuse angle 51 to each other. As seen in one direction of observation 53, which is symbolized in FIGS. 4a and 4b by means of an arrow, the input units 5 and/or 17 are inclined away from the operator of the human-machine interface 1. In relation to an operator, the regulating input unit 5 and/or the input unit 17 are inclined away therefrom, in particular, at an obtuse angle of e.g. between 180 and 150 degrees, preferably, about 179 to 175 degrees. Due to this inclination on the one hand, comfortable handling is made possible when operating the laterally arranged input units. Moreover, any possible faulty operations occurring thereby when using the touch-sensitive screen, by an arm of the operator for example, can be avoided since it is inclined away from the arm of the operator and cannot therefore be inadvertently touched thereby.

In the following, a method of interactively controlling the machine 3 by means of the human-machine interface 1 is described in more detail with reference to FIG. 2:

The regulating input unit 5, the parameter input unit 7 and the parameter display unit 9 are provided by the human-machine interface 1. The manual regulating input 25 for manually controlling the regulating function of the machine 3 is then detected. The parameter input 27 is detected simultaneously whereby, likewise simultaneously, the regulating parameter such as a regulating speed that is optically perceptible to the operator of the human-machine interface 1 by means of the parameter display unit 9 is fed back. Preferably, the process of detecting the manual selection input 29 for selecting the regulating function at the provided selection input unit 42 has been effected beforehand. As a reaction to or in dependence on the selection input 29, the regulating input unit 5 is enabled. It is only then that detection of the manual regulating input 25 can be effected. In accordance with a preferred alternative, it is conceivable for the selection input 29 to likewise be fed back or acknowledged. This is conceivable, in particular, by back-lighting the relevant operating element 21 to different levels of brightness. For example, after being operated, the operating element 21 of the input unit 17 or the selection input unit 42 can be back-lit at maximum brightness. Selectable operating elements 21 or regulating functions controllable thereby can be back-lit at medium brightness. Non-selectable regulating functions i.e. regulating functions that are not available in the machine 3 cannot be back-lit or can only be back-lit to a weaker level of back-lighting e.g. at the input unit 17.

In accordance with a further alternative, feed back of the enabling process and/or the selected regulating function is also effected at the regulating input unit 5. This is likewise effected if necessary by means of back-lighting, in particular, raising the brightness of the relevant operating elements 21 and/or by means of the symbol 41 illustrated on the screen 23. The selected regulating function can be visualized by means of the symbol 41. Detection of the manual regulating input by means of the corresponding operating elements 21 of the regulating input unit 5 can be effected in corresponding manner. The operating elements 21 of the regulating input unit 5 are thus dynamically assigned in dependence on the selection input 29 at the regulating input unit 5.

The illuminated readout 15 and/or the parameter display unit 9 have a Y-shape which tapers in the direction of corner 35, whereby an intuitive operation and/or setting of the regulating parameters is assisted or becomes possible. The parameter input unit 7 forms a slider for adjusting parameters such as pressure, temperature, time points such as e.g. switching times between an injection process and a dwell pressure phase, time points for operating the ejector, partial cycle times e.g. in the case of multi-component injection processes, path information for the mould closing unit, the mould height, dosage and injection amount, the flow rate, the quantity of mixable components and much more besides, in particular, for adjusting and/or reducing the axle speeds of the regulating function or the machine 3. Advantageously, a parameter value that is to be adjusted can be effected almost steplessly or in a plurality of individual steps by simply pushing or sliding a finger over the surface 11 that is preferably implemented as a glass surface. In particular, the actually set parameter value i.e. the currently set regulating speed for example is visualized by means of the bar graph indicator 13 which comprises in particular a plurality of individual LEDs, in particular, in the form of a distinctive arrow in order to aid intuitive detection of the regulating parameter. The current state of the machine 3 can always be represented by modulating the illuminated readout 15 and/or the bar graph indicator 13, in particular, by means of appropriate colours.

The operating elements 21 are advantageously implemented such as to be discoverable in tactile manner, in particular, by means of glass cylinders 19. For example, the regulating functions ejector-forwards and ejector-back can thereby be realized immediately after a corresponding selection input 29 has been enabled. The corresponding triggering device or push-button is the glass cylinder 19 which is preferably fitted closely into and flush with a panel of the human-machine interface 1, whereby both the stroke-length and force-path characteristic of a typical key or a push-button are capable of being simulated by an actuation process. Due to the flush, close-fitting installation and the choice of material, the glass of the key cylinder i.e. the glass cylinder 19, simple cleaning of the regulating input unit 5, the input unit 17 and/or the entire human-machine interface 1 is possible. The operating elements 21 and in particular their glass cylinders 19 preferably contain one of the pictograms 39 and are preferably back-lit at a plurality of brightness levels, e.g. for symbolizing a selection state and/or that it is available for operation. In particular, operating elements 21 that are operable for a user prompting system can be illuminated, whereas not currently operable ones are darkened.

The input unit 17 which is implemented as a keyboard strip for example preferably comprises all of the essential functions for the operation of an injection moulding machine and also a corresponding plurality of pictograms 39 which are arranged in fixed locations on the human-machine interface 1, i.e. are re-findable at any time in an optimal way. Operating elements 21 or keys having a switching function such as drives-on/off, can symbolize their state of actuation, in particular, by a back-light system incorporating different levels of brightness.

The regulating input unit 5 which is likewise preferably implemented as a keyboard strip comprises freely-assignable operating elements 21 or keys. In particular, the operating elements 21 exhibit arrow symbols which can symbolize a direction of the regulating parameters that are manually controllable thereby. In addition, the symbols 41 for indicating the respective function of the operating elements 21 which are arranged alongside them to the right as viewed in the direction of FIG. 2 are illustrated on the screen 23. In particular, the touch-sensitive screen 23 is implemented as a high resolution multi-touch screen. The respective symbol 41 may be split as necessary in order to additionally symbolize the directions of the regulating function.

It is particularly preferred that the regulating input unit 5 and/or input unit 17 be connected directly to a control system of the machine 3 by means of a real time interface which is not illustrated in more detail in the Figures. They are thereby independent of a computing or data processing device of the human-machine interface 1. The regulating input unit and/or the input unit is thereby not effective on the HMI PC, but is operatively connected directly to the machine control system by a synchronous serial interface. It is thus possible to have a direct feedback between the nominal value and the actual value via the parameter display unit 9 and a parameterisation process in real time.

As is perceivable in FIG. 3, the entire human-machine interface 1 or the surface 37 of the screen 23 can be inclined to the machine 3 or can be attached to a pictorially not illustrated stand, in particular, at an angle of between 10 and 20 degrees and especially 15 degrees to the vertical. The ergonomics for the workstations can thereby be optimized. Furthermore, the human-machine interface 1 can be adaptable to operators of differing heights by a vertical adjustment process. Moreover, as is apparent from FIG. 4b, the regulating input unit 5 and/or the input unit 17 are slightly inclined to the rear and together with the contra-directional inclination of a housing of the human-machine interface 1 facilitate the operation of the individual operating elements 21 or keys and the surface 11 of the parameter input unit 7.

In the concrete preferred exemplary embodiment, a function for driving an axle can be implemented directly by actuating a permanently assigned operating element 21 in the input field 17 e.g. the key "screw forwards". Hereby, some of these keys are direct driving keys, i.e. a direct (manually operated) movement is effected upon the actuation thereof. In the automatic cycle state however, actuation of this key is blocked since an actuating action is not plausible, this being visualized by the absence of back-lighting. In the manual operational state, the operating elements 21 are unblocked, back-lit, and are back-lit yet more brightly upon actuation. In the input field 17, the essential keys for the injection moulding machine are permanently assigned so that operation without on-screen navigation is possible.

It is self-evident that this description can be subjected to the most diverse modifications, changes and adaptations which fall within the range of equivalents to the accompanying Claims.

LIST OF REFERENCE NUMERALS

1 human-machine interface
3 machine
5 regulating input unit
7 parameter input unit
9 parameter display unit
11 surface
13 bar graph indicator
15 illuminated readout
17 input unit
19 glass cylinder
21 operating element
23 screen
25 regulating input
27 parameter input
29 selection input
31 right-hand edge
33 lower edge
35 corner
37 surface
39 pictograms
41 symbol
42 selection input unit
43 mounting console
45 mounting surface
47 boring
49 through hole
51 angle
53 direction of view

The invention claimed is:

1. Hunan-machine interface for the simultaneous and interactive control of a regulating function of a machine, comprising:
a touch-sensitive screen,
a regulating input unit by means of which a regulating function of the machine is manually controllable in dependence on a regulating input,
a parameter input unit that is operable independently of the regulating input unit and by means of which a regulating parameter of the regulating function is simultaneously manually controllable in dependence on a parameter input, and
a parameter display unit that is arranged together with the parameter input unit and by means of which the manually controlled regulating parameter is adapted to be fed back,
wherein the regulating parameter of the regulating function that is functionally dependent on the regulating function is simultaneously manually controllable by means of the regulating input unit,
wherein a nominal value or a current value of the regulating parameter that is actually occurring in the machine is adapted to be fed back by means of the parameter display unit,
wherein the parameter display unit comprises a bar graph indicator that is oriented along a longitudinal touch-sensitive surface of the parameter input unit.

2. A human-machine interface in accordance with claim 1, wherein a modulatable illuminated readout by means of which a state of the machine is displayable is provided at least laterally of or on each side of the bar graph indicator.

3. A human-machine interface in accordance with claim 2, wherein at least one of the bar graph indicator or the modulatable illuminated readout is conical.

4. A human-machine interface in accordance with claim 2, wherein the modulatable illuminated readout extends in a shape of a Y over the human-machine interface.

5. A human-machine interface in accordance with claim 1, wherein an independently operable selection input unit is provided by means of which the regulating function is selectable.

6. A human-machine interface in accordance with claim 1, wherein an input unit having permanently assigned keys is provided and wherein at least one of the parameter display unit or the parameter input unit is arranged between the input unit and the regulating input unit.

7. A human-machine interface in accordance with claim 6, wherein the input unit comprises glass cylinders that are let into and are flush with the surface and serve as haptically perceptible operating elements.

8. viously presented) A human-machine interface in accordance with claim 1, wherein the regulating input unit comprises glass cylinders that are let into and are flush with the surface and serve as haptically perceptible operating elements.

9. A human-machine interface in accordance with claim 1, wherein the regulating input unit is connected to a machine control system of the machine by means of a real time interface.

10. A human-machine interface in accordance with claim 6, wherein the input unit is connected to a machine control system of the machine by means of a real time interface.

11. Method of interactively controlling a regulating parameter of a machine by means of a human-machine interface, comprising:
providing a touch-sensitive screen,
providing a regulating input unit of the human-machine interface,
detecting a manual regulating input by means of the regulating input unit for manually controlling a regulating function of the machine,
providing a parameter input unit of the human-machine interface,
simultaneously detecting a manual parameter input by means of the parameter input unit for manually controlling a parameter of the regulating function the parameter being functionally dependent on the regulating function,
providing a parameter display unit of the human-machine interface,
simultaneously feeding back the regulating parameter of the regulating function by means of the parameter display unit,
simultaneously controlling the regulating function and the regulating parameter and thereby feeding back a nominal value or a current value of the regulating parameter of the regulating function that is actually occurring in the machine by means of a bar graph indicator oriented along a longitudinal touch-sensitive surface of the parameter display unit,
operating the touch-sensitive screen independently of the parameter input unit.

12. A method in accordance with claim 11, comprising the step of:
connecting at least one of the regulating input unit or an input unit to a machine control system of the machine by means of a real time interface.

13. A method in accordance with claim 11 further comprising the steps of
providing a selection input unit of the human-machine interface,
detecting a manual selection input by means of the selection input unit for selecting the regulating function,
enabling the regulating input unit for detecting the manual regulating input in dependence on the detected selection input.

14. A method in accordance with claim 11 further comprising the steps of
dynamically assigning a physical operating element of the regulating input unit in dependence on the manual selection input,
detecting the manual regulating input by means of the physical operating element of the regulating input unit.

15. Injection moulding machine with a human-machine interface in accordance with claim 1.

16. Injection moulding machine with a human-machine interface configured, equipped, constructed or programmed to carry out a method in accordance with claim 11.

* * * * *